(12) United States Patent
Harper et al.

(10) Patent No.: US 10,330,015 B2
(45) Date of Patent: Jun. 25, 2019

(54) TRANSIENT EMISSION TEMPERATURE CONTROL OF TURBINE SYSTEMS

(71) Applicant: General Electric Company, Schenectady, NY (US)

(72) Inventors: James Harper, Greenville, SC (US); Akilez Krishnamurthy Arthanari, Hyderabad (IN)

(73) Assignee: General Electric Company, Schenectady, NY (US)

( * ) Notice: Subject to any disclaimer, the term of this patent is extended or adjusted under 35 U.S.C. 154(b) by 4 days.

(21) Appl. No.: 14/865,936

(22) Filed: Sep. 25, 2015

(65) Prior Publication Data
US 2017/0089267 A1    Mar. 30, 2017

(51) Int. Cl.
F02C 9/26    (2006.01)
F02C 7/26    (2006.01)
G01M 15/14  (2006.01)
F02C 9/54    (2006.01)

(52) U.S. Cl.
CPC ............... F02C 7/26 (2013.01); F02C 9/26 (2013.01); F02C 9/266 (2013.01); F02C 9/54 (2013.01); G01M 15/14 (2013.01); F05D 2270/08 (2013.01); F05D 2270/0831 (2013.01); Y02T 50/677 (2013.01)

(58) Field of Classification Search
CPC ........... F02C 9/26; F02C 9/266; G01M 15/14; F05D 2270/08; F05D 2270/0831
See application file for complete search history.

(56) References Cited

U.S. PATENT DOCUMENTS

| | | | |
|---|---|---|---|
| 6,612,112 B2 | 9/2003 | Gilbreth et al. | |
| 6,912,856 B2 | 7/2005 | Morgan et al. | |
| 2006/0107666 A1* | 5/2006 | Kothnur | F02C 7/222 60/773 |
| 2012/0017601 A1* | 1/2012 | Eroglu | F02C 6/003 60/776 |
| 2014/0123668 A1 | 5/2014 | Huntington et al. | |
| 2015/0152791 A1* | 6/2015 | White | F02C 9/26 60/773 |
| 2016/0115839 A1 | 4/2016 | Abrol et al. | |

FOREIGN PATENT DOCUMENTS

| | | |
|---|---|---|
| EP | 2 025 902 A2 | 2/2009 |
| EP | 2 600 063 A2 | 6/2013 |
| EP | 2 738 371 A2 | 6/2014 |

OTHER PUBLICATIONS

Extended European Search Report and Opinion issued in connection with corresponding EP Application No. 16188038.0 dated Feb. 24, 2017.

* cited by examiner

*Primary Examiner* — Erick R Solis
(74) *Attorney, Agent, or Firm* — Fletcher Yoder, P.C.

(57) ABSTRACT

In one embodiment, a system is provided. The system includes a turbine control system, comprising a processor. The processor is configured to receive an input for transitioning between a normal load path (NLP) of a turbine system and a cold load path (CLP) of the turbine system. The processor is additionally configured to determine a carbon monoxide (CO) setpoint based on the input. The processor is further configured to apply a temperature control based on the CO setpoint, wherein the normal load path comprises higher emissions temperatures as compared to the cold load path.

20 Claims, 4 Drawing Sheets

TRANSIENT EMISSION TEMPERATURE CONTROL OF TURBINE SYSTEMS

BACKGROUND

The subject matter disclosed herein relates to turbine systems and, more particularly, to system and methods for turbine system control providing certain emission temperatures.

Certain turbine systems, such as a gas turbine providing power in a power plant, typically include at least one gas turbine engine having a compressor, a combustor system, and a turbine. The combustor system combusts a mixture of fuel and compressed air to generate hot combustion gases, which, in turn, drive blades of the turbine, for example, to produce rotative power. Exhaust gas produced by the gas turbine engine may include certain byproducts, such as nitrogen oxides ($NO_x$, including NO and $NO_2$), sulfur oxides ($SO_x$), carbon oxides ($CO_x$), and unburned hydrocarbons.

Gas turbine systems may include control systems to monitor and control the operations of the gas turbine system. For example, control systems may control various parameters, such as firing temperature, fuel flow, and compressor air flow, to operate the gas turbine systems to have a specified power output and/or to reduce exhaust gas emissions. When the gas turbine systems operation changes suddenly or transiently (e.g., when required power output drops, or when switching or transitioning from a load path to another load path), the control systems may adjust the various parameters accordingly (e.g., to produce only the required power and/or to have new exhaust gas emissions). Therefore, it would be beneficial to improve control of the gas turbine systems, especially during transient periods.

BRIEF DESCRIPTION

Certain embodiments commensurate in scope with the present disclosure are summarized below. These embodiments are not intended to limit the scope of the claims, but rather these embodiments are intended only to provide a brief summary of certain embodiments. Indeed, embodiments of the present disclosure may encompass a variety of forms that may be similar to or different from the embodiments set forth below.

In one embodiment, a system is provided. The system includes a turbine control system, comprising a processor. The processor is configured to receive an input for transitioning between a normal load path (NLP) of a turbine system and a cold load path (CLP) of the turbine system. The processor is additionally configured to determine a carbon monoxide (CO) setpoint based on the input. The processor is further configured to apply a temperature control based on the CO setpoint, wherein the normal load path comprises higher emissions temperatures as compared to the cold load path.

In another embodiment, a method includes receiving, via a processor, an input for transitioning between a normal load path (NLP) of a gas turbine system and a cold load path (CLP) of the gas turbine system. The method further includes determining, via the processor, a carbon monoxide (CO) setpoint based on the input, and applying, via the processor, a temperature control based on the CO setpoint, wherein the normal load path comprises higher emissions temperatures as compared to the cold load path.

In another embodiment, a machine-readable medium storing non-transitory processor-executable instructions is provided. The processor-executable instructions are configured to receive an input for transitioning between a normal load path (NLP) of a turbine system and a cold load path (CLP) of the turbine system. The processor-executable instructions are additionally configured to determine a carbon monoxide (CO) setpoint based on the input, and to apply a temperature control based on the CO setpoint, wherein the normal load path comprises higher emissions temperatures as compared to the cold load path.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

As noted above, a turbine system may operate at a steady state condition defined by certain emissions temperatures (e.g., exhaust temperature, firing temperature), fuel flows, air flows, and other parameters to produce a specified power output. For example, a gas turbine engine may run on a continuous basis (e.g., base load) producing base load power. The gas turbine engine may also run at part loads (e.g., fractions of the base load), for example, during startup of the gas turbine engine. During the startup, the gas turbine engine may operate toward the base load along one or more predetermined (e.g., programmed) paths, for example, a normal load path (NLP) and a cold load path (CLP). Each predetermined path may include operating the gas turbine engine with a particular set of operating parameters, such as fuel flows, air flows, firing temperatures, CO emissions, and the like, at various portions of the path. When the gas turbine engine switches from a predetermined path to another predetermined path, one or more operating parameters may be adjusted. For example, at a given load level, the NLP may correspond to a higher firing temperature or exhaust temperature, and the CLP may correspond to a lower firing temperature of exhaust temperature. When the gas turbine engine is switched from the NLP to the CLP, the firing or exhaust temperatures may be lowered (e.g., by reducing the fuel flow). As the firing temperature of the gas turbine engine is lowered, the CO to CO2 oxidation reaction may be quenched (e.g., by the cool regions of the combustion system), and therefore, the CO emissions may be increased. Accordingly, the transition may resulting in a firing temperature and corresponding CO emissions level that is above a desired threshold (e.g., a regulatory limit).

Provided herein are techniques for controlling transient operations of turbine systems. More specifically, the techniques in accordance with the present disclosure may be applied to the transient control of gas turbine engines when the gas turbine engine is switched from NLP operations to CLP operations during startup or during shutdown. During startup or during shutdown, the techniques described herein may adjust an inlet guide vane (IGV) control loop gain up or down depending on a raise or lower load request, which may keep the turbine engine running a higher firing temperature than a steady state temperature reference, thus reducing the likelihood of transient operability issues. A CO level may be targeted based on the minimum of a regulatory CO limit and a predicted CO multiplied by a factor, which increases the CO exhaust temperature transiently and then controls the reduction in temperature based on a time filter. Accordingly, larger changes in exhaust temperature reference may be minimized or eliminated, which minimizes swings in IGV and fuel stroke reference (FSR) control, thus reducing or eliminating operability issues such as IGV's opening too far or too little and/or too much or too little fuel delivery, which may lead to blowouts.

Figure 1:
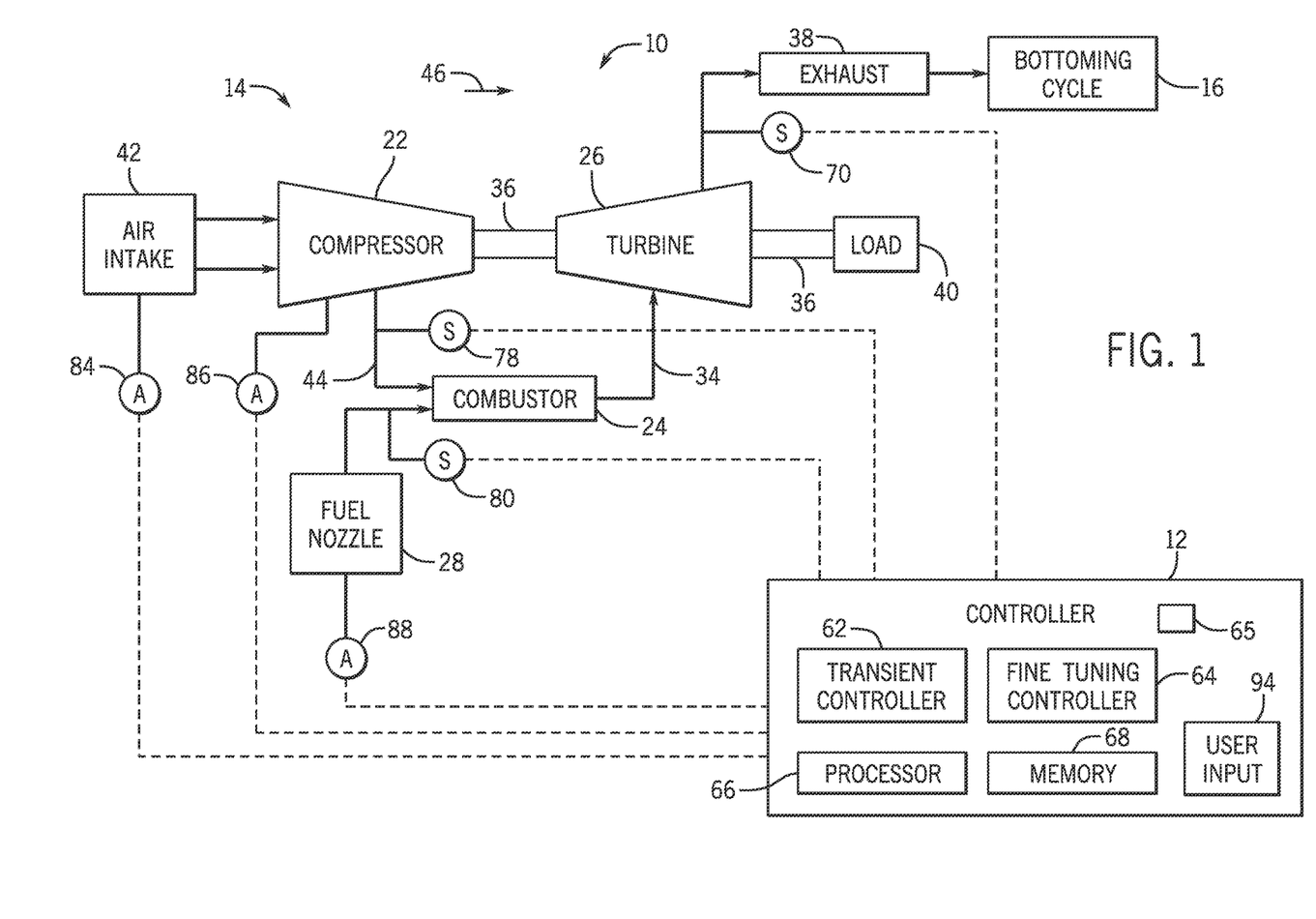
FIG. 1 is a block diagram of a gas turbine system that includes an controller for controlling emissions of the gas turbine system, in accordance with embodiments of the present disclosure.

With the foregoing in mind, FIG. 1 is a block diagram of a turbine system 10 that includes a controller 12, in accordance with the present disclosure, for controlling operations of the gas turbine system 10. The gas turbine system 10 includes a gas turbine engine 14 and a bottoming cycle 16. The gas turbine engine 14 may include, but is not limited to, a simple cycle heavy-duty gas turbine system or an aircraft engine derivative combustion system. The bottoming cycle 16 is configured to utilize heat (e.g., waste heat from exhaust) generated by the gas turbine engine 14 to generate electrical power and may include other components, such as a waste heat recovery boiler and a steam turbine, e.g., heat recovery steam generator (HRSG).

The gas turbine engine 14 includes a compressor 22, a turbine combustor 24, and a turbine 26. The turbine combustor 24 includes one or more fuel nozzles 28 that may route a liquid fuel and/or gas fuel, such as diesel, natural gas or syngas, into the turbine combustor 24. In the illustrated embodiment, the gas turbine engine 14 includes one turbine combustor 24, however, it should be noted that the gas turbine engine 14 may include any number of the turbine combustors 24.

The turbine combustor 24 ignite and combust an air-fuel mixture, and then pass hot pressurized combustion gases 34 (e.g., exhaust) into the turbine 26. Turbine blades of the turbine 26 are coupled to a shaft 36, which is also coupled to several other components throughout the gas turbine engine 14. In some embodiments, the turbine combustor 24 is a dry low nitrous oxide (NOx) (DLN) combustor 24 available from General Electric Company of Schenectady, N.Y. The DLN combustor 24 may run several modes, for example, to reduce emission levels. Modes may include a primary mode where fuel is delivered to primary nozzles only; a lean-lean mode where fuel is delivered to both primary and secondary nozzles and both primary and secondary nozzles have flame, secondary mode where fuel is delivered to secondary nozzles only, and premix mode, where fuel is delivered to both primary and secondary nozzles but flame is in secondary nozzles only. In a part load, the fuel delivered to the DLN combustor 24 may be operating at primary mode and not at premixed mode. As the combustion gases 34 pass through the turbine blades in the turbine 26, the turbine 26 is driven into rotation, which causes the shaft 36 to rotate. Eventually, the combustion gases 34 exit the gas turbine engine 14 as a stream of exhaust gas 38. Further, the shaft 36 may be coupled to a load 40, which is powered via rotation of the shaft 36. For example, the load 40 may be any suitable device that may generate power via the rotational output of the gas turbine engine 14, such as an electrical generator, a propeller of an airplane, and so forth.

Compressor blades are included as components of the compressor 22. The compressor blades are coupled to the shaft 36 and will rotate as the shaft 36 is driven to rotate by the turbine 26, as described above. The rotation of the compressor blades within the compressor 22 compress air from an air intake 42 into pressurized air 44. The pressurized air 44 is then fed into the fuel nozzles 28 of the turbine combustor 24. The one or more fuel nozzles 28 mix the pressurized air 44 and the fuel to produce a suitable mixture ratio for combustion (e.g., a combustion that causes the fuel to more completely burn) so as not to waste fuel or cause excess emissions.

Exiting the turbine 26, the exhaust gas stream 38 may continue to flow in a downstream direction 46 toward the bottoming cycle 16. As a result of the combustion process, the exhaust gas stream 38 may include certain byproducts, such as nitrogen oxides ($NO_x$, including NO and $NO_2$), sulfur oxides ($SO_x$), carbon oxides ($CO_x$, including CO), and unburned hydrocarbons. The exhaust gas stream 38 may then be delivered to the bottoming cycle 16 for further processing and/or usage. For example, the bottoming cycle 16 may include a gas treatment system, a heat recovery steam generator (HRSG), and a steam turbine.

As noted above, the gas turbine system 10 includes the controller 12 that may be used to control the operation of the gas turbine system 10, including transient operations of the gas turbine system 10 during startup or during shutdown. More specifically, during transient operations, the controller 12 is configured to control operations of the gas turbine system 10 to switch from following NLP operations to following CLP operations, for example, during startup or shutdown of the system 10. To minimize or prevent transients (e.g., too high exhaust emissions of certain species like CO and nitrous oxides) and/or to prevent blowout conditions, the controller 12 may set a CO target as a new CO reference, such that the CO target is based on the minimum of a regulatory CO limit and a predicted CO multiplied by a factor. Once the controller 12 is following CLP operations, the controller 12 may additionally or alternatively adjust an inlet guide vane (IGV) control loop gain up or down based on certain load requests (e.g., operator load requests), which may keep the turbine engine running at a higher firing temperature than a steady state temperature reference, thus reducing the likelihood of transient operability issues.

Figure 2:
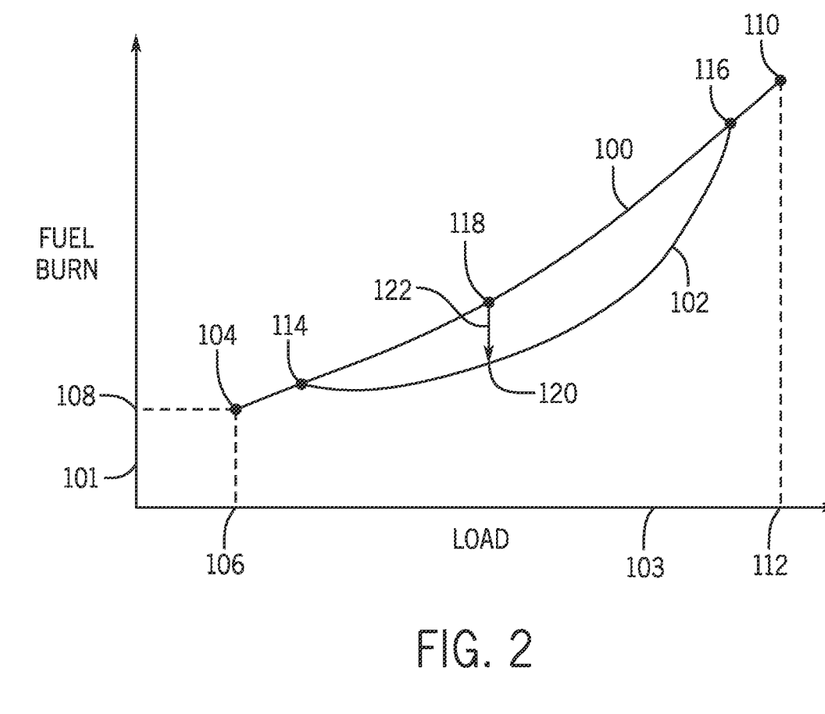
FIG. 2 is a chart view of embodiments of NLP and CLP operations, and a transition from NLP to CLP operations.

It may be beneficial to describe NLP and CLP operations, and transitions from NLP to CLP (or vice versa). Accordingly, FIG. 2 illustrates an embodiment of a NLP 100 and an embodiment of a CLP 102 that may be used to control the gas turbine system 10 during the startup. As illustrated in FIG. 2, the NLP 100 and the CLP 102 each show a general upward trend as the fuel burn or fuel consumption shown in axis 101 increases with respect to a desired load level shown in axis 103. As illustrated, during startup, the gas turbine system 10 may start from a first point 104 that may correspond to an initial load level 106 and an initial fuel burn 108, running towards a second point 110 that may correspond to a desired base load level 112. From the first point 104 to the second point 110, the gas turbine engine may operate along one or more paths or curves (e.g., fuel burn as a function of load level), for example, the NLP 100 and/or the CLP 102. The CLP 102 may result in a higher net efficiency than the NLP 100 while generally maintaining a lower exhaust temperature. More specifically, firing temperature, and exhaust temperature are typically higher in the NLP 100, but the CO is lower and the NOx is higher in the NLP 100. Lower exhaust temperatures may increase part life as well as net efficiency. The CLP 102 generally improves efficiency of the system 10 by increasing inlet guide vane angles (higher airflow and compression ratio) with a reduction in firing temperature for the same load as compared to the NLP 100. NLP 100 has typically higher emissions temperature, e.g., the firing temperature, and exhaust temperature are typically higher in the NLP 100 as compared to the CLP 102. In the NLP 100, higher firing and exhaust temperatures are found but the CO is lower while the NOx is higher in the NLP 100.

The NLP 100 and the CLP 102 may overlap during a portion of the load level between the initial load level 106 and the base load level 112. By way of example, the NLP 100 and the CLP 102 may overlap between the first point 104 and a third point 114 and between a fourth point 116 and the second point 110. Between the third point 114 and the fourth point 116, the NLP 100 and the CLP 102 do not overlap, and the gas turbine system 10 may switch between the NLP 100 and the CLP 102. For example, the gas turbine system 10 may start from the first point 104 and run toward the base load point 110 along the NLP 100. At a fifth point 118 on the NLP 100, the gas turbine system 10 may switch to the CLP 102 to a sixth point 120 on the CLP 102, for example, via a transition line 122. While transition line 122 is depicted as a vertical line, transition 122 may be a line having a positive or negative slope, or may be non-linear (e.g., a curve). Because between the third point 114 and the fourth point 116, the CLP 102 includes less fuel burn than the NLP 100 at any load level, the gas turbine system 100 may have a lower firing and exhaust temperatures when operating along the CLP 102 compared to the NLP 100.

A lower firing temperature may correspond to a higher CO emissions level for the gas turbine system 10. As such, the gas turbine system 10 may operate near a predetermined CO threshold (e.g., regulatory CO limit) when operating along the CLP 102. That is, in one embodiment, the CLP 102 may by design result in CO emissions near to the predetermined CO threshold. Accordingly, when switching from the NLP 100 to the CLP 102 (e.g., in the transition line 122), swings of the fuel burn level should be reduced or eliminated so as to not result in CO emissions over the predetermined CO threshold. The controller 12, as discussed in greater detail below, may control the gas turbine system 10 in the transition operations from the NLP 100 to the CLP 102 (or vice versa) so as to respect the predetermined CO threshold.

More specifically and turning now back to FIG. 1, the controller 12 may include a transition controller 62 and a fine tuning controller 64, which may work together to control the gas turbine system 10, during startup or during shutdown, to switch from the NLP 100 to the CLP 102 (e.g., along the transition process 122) and continue along the CLP 102 toward the base load level (e.g., the base load point 110), or to switch from the CLP 102 to the NLP 100 (e.g., reverse of the transition process 122) and continue along the NLP 100 toward the base load level (e.g., the base load point 110). In certain embodiments, a CO controller 65 and/or other controllers (e.g., nitrous oxide [NOx] controller) may be used. The CO controller 65 may include model based control techniques, such as chemical, fluid flow, and/or physics-based models of the system 10. The CO controller 65 may receive certain inputs, such as temperature inputs (e.g. exhaust temperature inputs), fuel flow, pressures, speeds, and the like, and then derive control inputs (e.g., IGV inputs, fuel flow inputs) suitable for maintaining a desired CO level. The controllers (e.g., 62, 64, 65) may be implemented in software stored in a memory 68 and executable by one or more processors 66, and/or implemented in hardware.

The transition controller 62 is configured to control switching of the gas turbine system 10 between the NLP 100 and CLP 102 based on CO emissions level in the exhaust 38. The CO emissions level in the exhaust 38 may be monitored continuously and/or periodically by any suitable devices, such as a sensor 70, operatively coupled to, disposed in, or fluidly in communication with the outlet of the turbine 26. Once the gas turbine system 10 is switched to a new load path (e.g., from the NLP 100 to the CLP 102), the fine tuning controller 64 is configured to control the gas turbine system 10 to operate along the new load path toward the based load level.

As illustrated, the processor 66 may be any general purpose or application-specific processor(s). The memory 68 may include one or more tangible, non-transitory, machine-readable media collectively storing instructions executable by the processor 66 to perform the methods and control actions described herein. For example, the memory 68 may include RAM, ROM, EPROM, EEPROM, CD-ROM, flash memory, or other optical disk storage, magnetic disk storage or other magnetic storage devices. The controller 12 may further include one or more analog-to-digital (A/D) converters for processing various analog inputs to the controller 12, and digital-to-analog (D/A) converters for converting digital output into analog signals that may actuate one or more actuators (e.g., IGV actuators, fuel valves). In some embodiments, the transition controller 62 and the fine tuning controller 64 may each include separate processor and memory, in additional to, or instead of, the processor 66 and the memory 68, for facilitating performing the control operations as described herein. It is to be understood that the transition and fine tuning controllers 62, 64 are shown as an example, and their functionality may be combined and incorporated in the controller 12.

The controller 12 may monitor one or more inputs from one or more sensors, including the sensor 70, located at various locations of the gas turbine system 10. The sensors may include, for example, pressure sensors, level sensors, temperature sensors, flow sensors, composition sensors, concentration sensors, status and position indicators (e.g. limit switches, Hall effect switches, acoustic proximity switches, linear variable differential transformers, position transducers), and the like. The sensors may be coupled to, disposed in or about, or fluidly in communication with various components of the gas turbine system 10 to obtain operating information thereof. For example, a compressor outlet sensor 78 may be operatively coupled to the outlet of the compressor 22 and obtain information including temperatures, gas flow rate, and pressure of the air flowing into the combustor 24. One or more fuel sensors 80 may be operatively coupled to the one or more fuel nozzles 28 and obtain information including temperatures, gas flow rate, and pressure of the fuel flowing into the combustor 24. The combination of the fuel sensor 80 and the compressor outlet sensor 78 may provide information on the fuel to air ratio in the combustor 24.

In addition, the controller 12 may be operatively coupled to various components of the gas turbine system 10 to control the operation of the gas turbine system 10. For example, the controller 12 may control the operation of one or more actuators coupled to and configured to move or control various components of the gas turbine system 10 (e.g., via switches, valves, motors, solenoids, positioners, or the like). By way of further example, the controller 12 may control the operation of the air intake 42 (e.g., via an actuator 84, such as an inlet guide vane actuator) and/or the compressor 22 (e.g., via an actuator 86) to regulate the air intake including the flow rate, temperature, pressure, and the like. The controller 12 may control the operation of the one or more fuel nozzles 28 (e.g., via one or more actuators 88) to regulate the fuel flowing into the combustor 24, including the flow rate, temperature, pressure, the fuel split, and the like.

Moreover, the controller 12 may include a user input system 94 configured to receive inputs (e.g., commands, functions) from a user and, based on the user inputs, to control operation of the gas turbine system 10. For example, the user input system 94 may include predetermined CO emission levels (e.g., as a function of load level, firing temperature, and the like), a load path (e.g., the NLP 100, the CLP 102), a switching point (e.g., load level where the gas turbine system 10 is switched from one load path to another load path), a desired power (e.g., megawatts), a desired fuel rate, electricity price, electricity demand, fuel price, combustor outage intervals, and/or other information related to operation of the turbine system 10.

Figure 3:
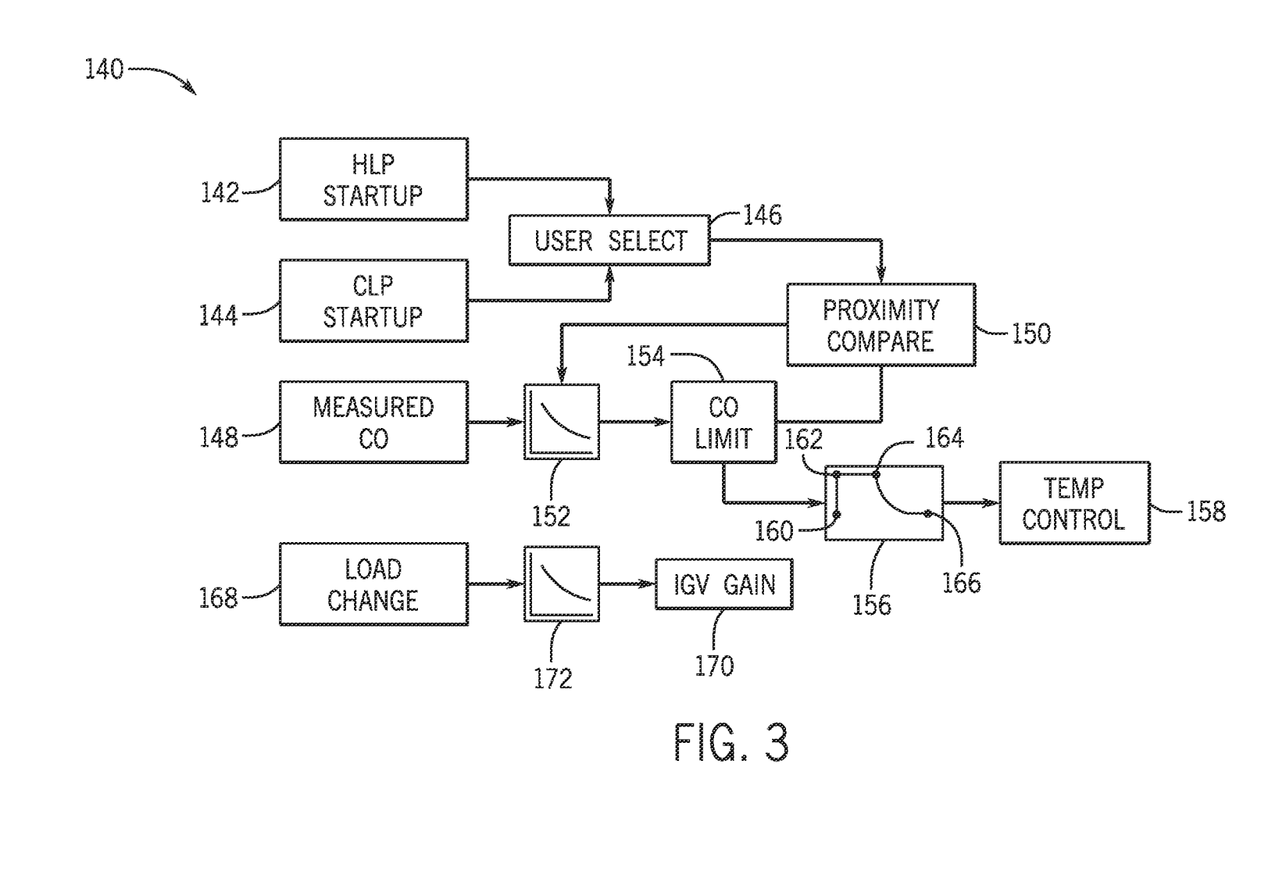
FIG. 3 is a block diagram of an embodiment of a control process suitable for minimizing or eliminating transients.

Turning now to FIG. 3, the figure is a block diagram of an embodiment of a control process 140 suitable for transient operations of the gas turbine system 10, such as operations when switching between the NLP 100 to the CLP 102 and then continuing on the CLP 102 until, for example, reaching a base load. As noted above, the gas turbine system 10, during startup or during part load, may operate along one or more load paths (e.g., NLP 100, CLP 102) toward the base load. For example, the gas turbine system may operate with a NLP or high temperature startup 142 (e.g., as illustrated by the NLP 100 in FIG. 2) and/or a CLP or low temperature startup 144 (e.g., as illustrated by the CLP 102 in FIG. 2). A user may at any time during startup (or shutdown) select (block 146), for example, using the user input system 94 of the controller 12, a particular load path. In other words, the user may switch from one load path to another load path. In some embodiments, the controller 12 (e.g., the processor 66 and the memory 68) may automatically choose a load path and/or automatically switch from one load path to another load path during startup or shutdown.

For illustrative purposes, the following discussion will be based on switching from the NLP 100 to the CLP 102, for example, along the transition 122 as illustrated in FIG. 2. However, it should be noted that the systems and methods described herein are also applicable to switching along any transition line or curve from the NLP 100 to the CLP 102 and/or the reverse process (e.g., switching from the CLP 102 to the NLP 100). As illustrated, the control process 140 includes measuring or otherwise deriving (block 148) the CO emissions level in the exhaust 38, for example, with the sensor 70 and or models in use via the CO controller 65. The proximity of the measured and/or derived CO emissions level to the predetermined CO threshold may then be determined (block 150) based on applying an adjustment function or CO limit model 152. That is, block 150 may look at a projected temperature and resultant projected CO (projected via model 152), compare the projected CO with the measured CO, and derive a CO limit 154 based on the comparison. The CO limit 154 may respect, for example, regulatory emissions levels. The CO limit 154 may then be applied, for example, via a factor and/or time filter 156, during temperature control (block 158). The temperature control (block 158) may be applied, for example, via transition controller 62 and/or the CO controller 65. For example, temperature, such as exhaust 38 temperature, may be controlled (block 158) by multiplying the CO limit 154 by a factor (e.g., between 0.08 to 1.20). The raised temperature may thus respect emission regulatory limits. A time filter or time range may then used to control the temperature (block 156) as the temperature is reduced back, for example, to a non-factor multiplied range. More specifically, a start point 160 illustrates a start of rising temperature control, which then rises to point 162 and continues to point 164. The time filter is thus the time between 162 and 164 and/or between 160, 162, and 164. After the time filter, the temperature is dropped back down to point 166. Accordingly, during transient conditions (e.g., higher or lower load periods), swings in exhaust temperature reference may be minimized or eliminated, which may reduce or eliminate IGV and FSR control issues.

Once the transition 120 enters the CLP operations 102, then the controller system 12 (e.g., via the fine tuning controller 64) may respond to transient conditions by applying an IGV gain or bias 170. More specifically, in response to load changes 168, the control system 12 (e.g., fine tuning controller 64) may access a tuning model 172 to increase or lower the IGV gain 170 based on current conditions. For example, higher load changes may result in lower IGV gains 170, while lower load changes may result in higher IGV gains 170. Accordingly, transients occurring when the turbine system 10 is in CLP operations 102 may be reduced or eliminated.

Figure 4:
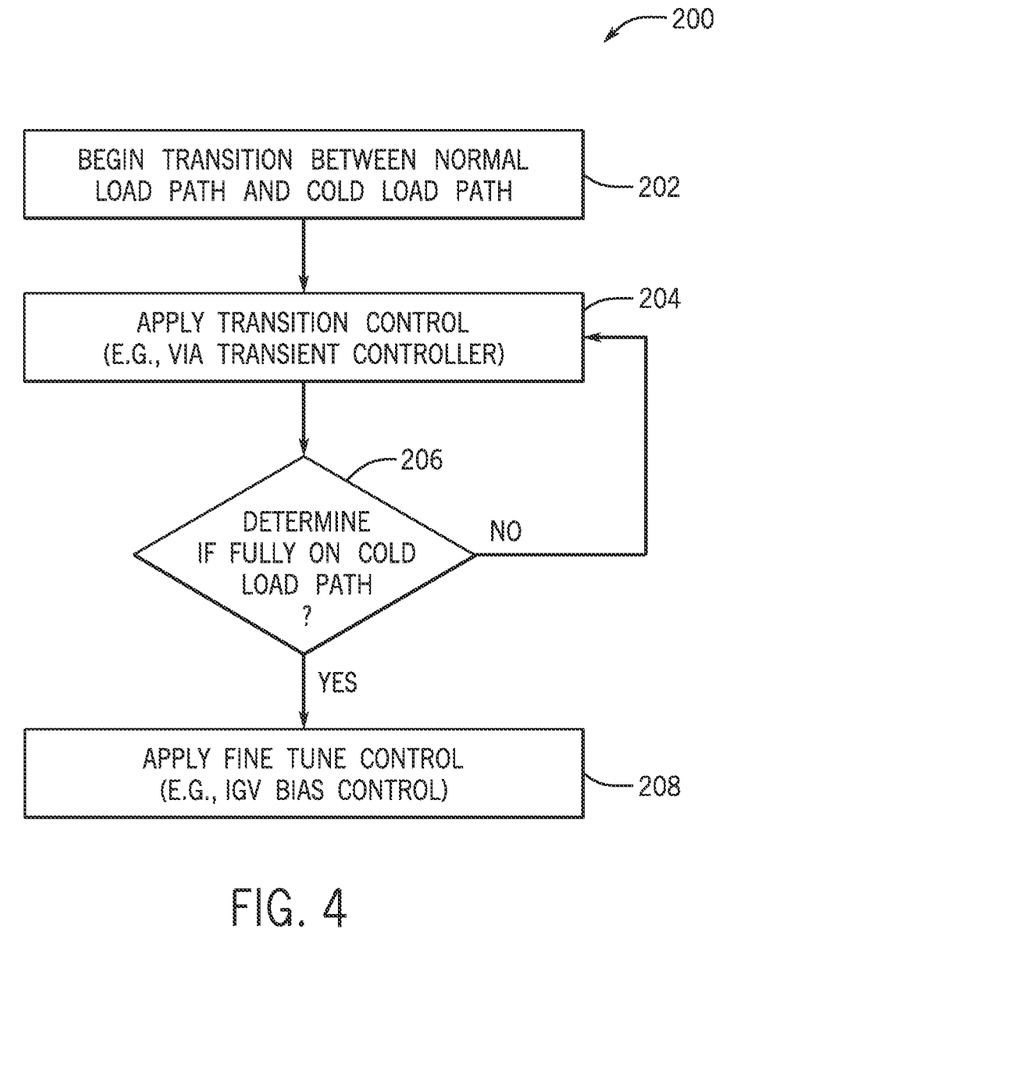
FIG. 4 is a flow chart of an embodiment of the control process of FIG. 3.

FIG. 4 is a flow chart of an embodiment of a process 200 for controlling transient operations of the gas turbine system 10, in accordance with the present disclosure. The process 200 may be performed by the components described above (e.g., the controller 12, the sensor 70). The process 200 may be implemented as executable computer code or instructions executable via the processor 66 and stored in the memory 68 of the controller system 12. In the illustrated embodiment, the process 200 includes beginning (block 202) a transition (e.g., transition 120) between two load paths, such as the NLP 100 and the CLP 102, during startup or shutdown of the gas turbine system 10. If during the transition (e.g., transition 120) transients occur, the process may then apply transient transition control (block 204), for example, as described above, a CO level may be targeted based on the minimum of a regulatory CO limit and a predicted CO multiplied by a factor, which increases the CO exhaust temperature transiently. The control may then apply a reduction in temperature based on a time filter.

The process 200 may then determine (decision 204) if operations have transitioned to be fully on the CLP 102. If not, then the process 200 iterates back to block 204. If control is now on the CLP 102, the process 200 applies fine tune control (block 208). For example, IGV control loop gain 170 may be changed up or down depending on a raise or lower load request, which may keep the turbine engine running a higher firing temperature than a steady state temperature reference, thus reducing the likelihood of transient operability issues. In this manner the control system 12 may minimize or prevent transient issues, even when transition between NLP 100 to CLP 102 and operating at CLP 102.

Technical effects of the invention include minimizing or preventing issues relating to transient conditions during transitions from NLP to CLP operations (or vice versa), and during CLP operations. CLP operations are typically more efficient that NLP operations because CLP operations may increase IGV angles (higher airflow and compressor pressure ratios) with a reduction in firing temperature for the same load as compared to the NLP operations. Likewise, control overcompensation due to transient conditions may be minimized or eliminated. By providing for the more optimal handling of transient conditions, equipment life may be maximized and operations may occur in a more efficient manner.

This written description uses examples to disclose the embodiments, including the best mode, and also to enable any person skilled in the art to practice the invention, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A system comprising:
    a turbine control system, comprising a processor configured to:
    receive an input for transitioning between a normal load path (NLP) of a turbine system and a cold load path (CLP) of the turbine system;
    determine a carbon monoxide (CO) setpoint based on the input and on a modeled function relationship between a firing temperature and CO emitted by the turbine system, wherein the modeled function relationship comprises a function having a decrease in the CO emitted as the firing temperature for the turbine system increases, wherein the function comprises the CO produced in a first axis and the firing temperature in a second axis, and wherein the CO setpoint is determined to maintain the CO emitted by the turbine system below a CO regulatory limit; and
    control a firing temperature of the turbine system by modulating a fuel valve configured to deliver a fuel to the turbine system based on the CO setpoint, wherein the normal load path comprises higher emissions temperatures as compared to the cold load path.

2. The system of claim 1, wherein the processor is configured to determine the CO setpoint by setting a CO target temperature to a factor above a predicted CO level or above a regulatory CO level.

3. The system of claim, 2, wherein the factor comprises between 0.08 and 1.2.

4. The system of claim 2, wherein the processor is configured to maintain the CO target temperature for a time period.

5. The system of claim 4, wherein the processor is configured to lower the CO target temperature after expiration of the time period.

6. The system of claim 1, wherein the processor is configured to determine the CO setpoint by adding a bias to a CO controller.

7. The system of claim 1, wherein the processor is configured to determine the CO setpoint by determining an exhaust temperature of an exhaust exiting the turbine system.

8. The system of claim 1, wherein the processor is configured to determine if the turbine system is operating at the cold load path, and to apply a fine tune control if the turbine system experiences a transient condition while operating at the cold load path.

9. The system of claim 8, wherein the fine tune control comprises applying an inlet guide vane (IGV) gain control by applying an IGV gain bias.

10. The system of claim 1, wherein the processor is configured to control the firing temperature of the turbine by modulating a inlet guide vane configured to deliver an oxidant to the turbine system, and wherein the higher emissions temperatures comprises higher firing temperatures, higher exhaust temperatures, or a combination thereof.

11. A method, comprising:
    receiving, via a processor, an input for transitioning between a normal load path (NLP) of a gas turbine system and a cold load path (CLP) of the gas turbine system;
    determining, via the processor, a carbon monoxide (CO) setpoint based on the input and a modeled function relationship between a firing temperature and CO emitted by the gas turbine system, wherein the modeled function relationship comprises a function having a decrease in the CO emitted as the firing temperature for the turbine system increases, wherein the function comprises the CO produced in a first axis and the firing temperature in a second axis, and wherein the CO setpoint is determined to maintain the CO emitted by the turbine system below a CO regulatory limit; and
    controlling, via the processor, a firing temperature of the gas turbine system by modulating a fuel valve configured to deliver a fuel to the gas turbine system based on the CO setpoint, wherein the normal load path comprises higher emissions temperatures as compared to the cold load path.

12. The method of claim 11, comprising setting a CO target temperature to a factor above a predicted CO level or above a regulatory CO level.

13. The method of claim 12, comprising maintaining the CO target temperature for a time period.

14. The method of claim 11, comprising determining, via the processor, if the gas turbine system is operating at the cold load path, and applying, via the processor, a fine tune control if the gas turbine system experiences a transient condition while operating at the cold load path.

15. The method of claim 14, wherein the applying, via the processor, the fine tune control comprises applying an inlet guide vane (IGV) gain control.

16. The method of claim 11, wherein controlling, via the processor, a firing temperature of the turbine system by modulating a fuel valve configured to deliver a fuel to the turbine system comprises controlling the firing temperature during startup or during shutdown of the gas turbine system.

17. A machine-readable medium storing non-transitory processor-executable instructions, the processor-executable instructions configured to:
receive an input for transitioning between a normal load path (NLP) of a turbine system and a cold load path (CLP) of the turbine system;
determine a carbon monoxide (CO) setpoint based on the input and a modeled function relationship between a firing temperature and CO emitted by the turbine system, wherein the modeled function relationship comprises a function having a decrease in the CO emitted as the firing temperature for the turbine system increases, wherein the function comprises the CO produced in a first axis and the firing temperature in a second axis, and wherein the CO setpoint is determined to maintain the CO emitted by the turbine system below a CO regulatory limit; and
control a firing temperature of the turbine system by modulating a fuel valve configured to deliver a fuel to the turbine system based on the CO setpoint, wherein the normal load path comprises higher emissions temperatures as compared to the cold load path.

18. The machine-readable medium of claim 17, wherein the instructions are configured to determine the CO setpoint by setting a CO target temperature to a factor above a predicted CO level or above a regulatory CO level.

19. The machine-readable medium of claim 17, wherein the instructions are configured to maintain the CO target temperature for a time period.

20. The machine-readable medium of claim 17, wherein the instructions are configured to determine if the gas turbine system is operating at the cold load path, and to apply a fine tune control if the gas turbine system experiences a transient condition while operating at the cold load path by applying an inlet guide vane (IGV) gain control.

* * * * *